US011577527B2

(12) United States Patent
Qian et al.

(10) Patent No.: US 11,577,527 B2
(45) Date of Patent: Feb. 14, 2023

(54) DETERMINING ALIGNMENT USING FIDUCIALS

(71) Applicant: Hewlett-Packard Development Company, L.P., Spring, TX (US)

(72) Inventors: Li Qian, Sant Cugat del Valles (ES); Xavier Domingo Reguant, Sant Cugat del Valles (ES); Secundino Vicente Vicente, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/258,505

(22) PCT Filed: Mar. 11, 2019

(86) PCT No.: PCT/US2019/021686
§ 371 (c)(1),
(2) Date: Jan. 7, 2021

(87) PCT Pub. No.: WO2020/185210
PCT Pub. Date: Sep. 17, 2020

(65) Prior Publication Data
US 2021/0402800 A1    Dec. 30, 2021

(51) Int. Cl.
*B41J 3/60*    (2006.01)
*B41J 11/46*    (2006.01)
(Continued)

(52) U.S. Cl.
CPC . *B41J 3/60* (2013.01); *B41J 3/54* (2013.01); *B41J 11/46* (2013.01); *H04N 1/00761* (2013.01)

(58) Field of Classification Search
CPC .................................. B41J 3/60; B41J 11/46
See application file for complete search history.

(56) References Cited

U.S. PATENT DOCUMENTS 7,860,425 B2    12/2010  Mima et al.
9,581,640 B2     2/2017  Zeise
(Continued)

FOREIGN PATENT DOCUMENTS

CN    104822031 A    8/2015
JP    01-264871 A    10/1989
(Continued)

OTHER PUBLICATIONS

Durst Group, Durst Rho 312R with new Double-sided Printing System, Jan. 22, 2015, Youtube.
(Continued)

*Primary Examiner* — Scott A Richmond (57) ABSTRACT

A print apparatus is disclosed. In some examples, the print apparatus comprises a print head to deposit print agent onto a substrate; a detector to detect a fiducial; a first light source to back-illuminate the substrate, such that light from the first light source is to be detected by the detector through the substrate; and processing apparatus. The processing apparatus is to operate the print head to deposit print agent to form a first fiducial on a first side of the substrate, the first fiducial comprising a shape of a first colour and having a first dimension, and a background of print agent of a second, different colour, wherein the first dimension of the shape does not exceed a corresponding dimension of the background; operate the print head to deposit print agent to form a second fiducial on a second, opposite side of the substrate, the second fiducial comprising an inverted version of the shape of the first colour; operate the first light source to back-illuminate the substrate; operate the detector to detect the first and second fiducials; and determine whether the first fiducial is aligned with the second fiducial. A method and a machine-readable medium are also disclosed.

15 Claims, 6 Drawing Sheets

(51) Int. Cl.
*B41J 3/54* (2006.01)
*H04N 1/00* (2006.01)

(56) References Cited

U.S. PATENT DOCUMENTS

| | | |
|---|---|---|
| 9,718,288 B2 | 8/2017 | Hernandez Creus et al. |
| 10,081,209 B2 | 9/2018 | Barron et al. |
| 2011/0102817 A1 | 5/2011 | Hoover et al. |
| 2013/0089183 A1 | 4/2013 | Sura |
| 2013/0293613 A1 | 11/2013 | Berel |
| 2014/0037354 A1 | 2/2014 | Yuichiro |
| 2015/0116413 A1 * | 4/2015 | Duke .................. B41J 3/60 347/19 |
| 2015/0222820 A1 | 8/2015 | Costigan et al. |
| 2017/0100949 A1 | 4/2017 | Celinder et al. |
| 2018/0015754 A1 | 1/2018 | Vicente Vicente et al. |
| 2018/0111391 A1 | 4/2018 | Celinder et al. |

FOREIGN PATENT DOCUMENTS

| | | | |
|---|---|---|---|
| JP | 2008-129543 A | 6/2008 | |
| JP | 2008-216737 A | 9/2008 | |
| JP | 2011-186241 A | 9/2011 | |
| JP | 2012-121285 A | 6/2012 | |
| JP | 2016-137637 A | 8/2016 | |
| WO | WO-2015147820 A1 * | 10/2015 | .......... B41J 11/0095 |
| WO | 2017/200520 A1 | 11/2017 | |

OTHER PUBLICATIONS

HP—HP Latex 1500 and 3x00 Printer Series, HP Latex Knowledge Center, 1-4.

\* cited by examiner

```
┌─────────────────────────────────────────────────────────────┐
│ Printing, on a back side of a printable medium, a first     │
│ fiducial, the first fiducial comprising a shape in a first  │── 402
│ colour and having a first dimension, and a background of    │
│ print agent of a second colour, wherein the first dimension │
│ of the shape is substantially equal to or less than a       │
│ corresponding dimension of the background                   │
└─────────────────────────────────────────────────────────────┘
                              │
                              ▼
┌─────────────────────────────────────────────────────────────┐
│ Printing, on a front side of the printable medium, a second │── 404
│ fiducial, wherein the second fiducial comprises a mirrored  │
│ version of the shape in the first colour                    │
└─────────────────────────────────────────────────────────────┘
                              │
                              ▼
┌─────────────────────────────────────────────────────────────┐
│           Back-illuminating the alignment marker            │── 406
└─────────────────────────────────────────────────────────────┘
                              │
                              ▼
┌─────────────────────────────────────────────────────────────┐
│ Illuminating the printable medium by directing light onto   │── 502
│ the front side of the printable medium, the light being of  │
│ a colour that contrasts with the first colour               │
└─────────────────────────────────────────────────────────────┘
                              │
                              ▼
┌─────────────────────────────────────────────────────────────┐
│ Scanning the printable medium to determine positions of the │── 408
│ first and second fiducials                                  │
└─────────────────────────────────────────────────────────────┘
                              │
                              ▼
┌─────────────────────────────────────────────────────────────┐
│ Determining, based on the determined positions of the first │── 410
│ and second fiducials, whether the first and second fiducials│
│ are aligned                                                 │
└─────────────────────────────────────────────────────────────┘
                              │
                              ▼
┌─────────────────────────────────────────────────────────────┐
│ Adjusting, based on the alignment determination, a position │── 504
│ of an image to be printed onto the printable medium         │
└─────────────────────────────────────────────────────────────┘
```

DETERMINING ALIGNMENT USING FIDUCIALS

BACKGROUND

Some billboards and signs are intended to be viewed clearly both at day and at night. During the day, the sign is illuminated by daylight from the sun while, at night, the sign is illuminated by a light source. In some examples, the sign may be back-illuminated by a light source positioned behind the sign.

Signs that are to be backlit may be printed onto a translucent substrate using a double-sided printing technique. An image may be printed onto the front side of the substrate, which can be viewed clearly in daylight. A mirrored version of the image may be printed on to the back side of the substrate. At night, when the sign is backlit, the image that is viewed is a combination of the front side image and the back side image.

BRIEF DESCRIPTION OF DRAWINGS

Examples will now be described, by way of non-limiting example, with reference to the accompanying drawings, in which.

DETAILED DESCRIPTION

Billboards or signs that are intended to be viewed both during the day and at night using backlighting are sometimes referred to as "day and night" signs or "D&N" signs. An image (e.g. an advertisement) is printed on the front side of a substrate or media, and a mirror copy of the image is printed on the back side of the substrate or media. The substrate used for D&N signs may be translucent, or semi-transparent, such that, if the image printed on the front side of the substrate and the mirrored version of the image on the back side of the substrate are aligned with one another then, when the substrate is back-illuminated, the images on the front and back sides of the substrate should appear as a single image to a viewer. Thus, it is intended that the mirrored version of the image that is printed onto the back side of the substrate is aligned with the image that is printed onto the front side of the substrate.

Alignment patterns, or fiducials, are symbols, patterns or marks that may be printed separately to the main image (e.g. the image to be viewed by a viewer) and that may be used to determine whether or not the image on the front side and the mirrored copy of the image on the back side are aligned with another. When the printed substrate is displayed (e.g. in a billboard), the fiducials are typically not visible (or at least are not prominently displayed) to the viewer. One method of printing alignment patterns or fiducials involves printing a first alignment marker on the back side of the substrate, printing the intended image (i.e. a mirrored version of the image to be displayed to a viewer) on the back side of the substrate, and printing a second alignment marker (i.e. a mirror-image of the first alignment marker) on the front side of the substrate. The second alignment marker may be printed before the image is printed on the front side of the substrate, so that any alignment issues may be resolved before the image is printed. By analyzing the alignment markers, it is possible to determine whether they have been printed at such a location on the substrate that will result in the images appearing aligned. However, an alignment marker printed on one side of the substrate may interfere (e.g. overlap with or obscure) the alignment marker printed on the other side of the substrate, such that the relative positions of the alignment markers cannot clearly be determined.

According to the present disclosure, a mechanism is disclosed by which alignment markers can be printed onto both sides of the substrate, and the location of an alignment marker on one side of the substrate can be measured accurately without interference from the alignment marker on the other side of the substrate. Moreover, the mechanism disclosed herein can be integrated into a printing workflow such that the determination of the alignment of the alignment markers can be performed automatically, as part of the printing workflow.

Figure 1:
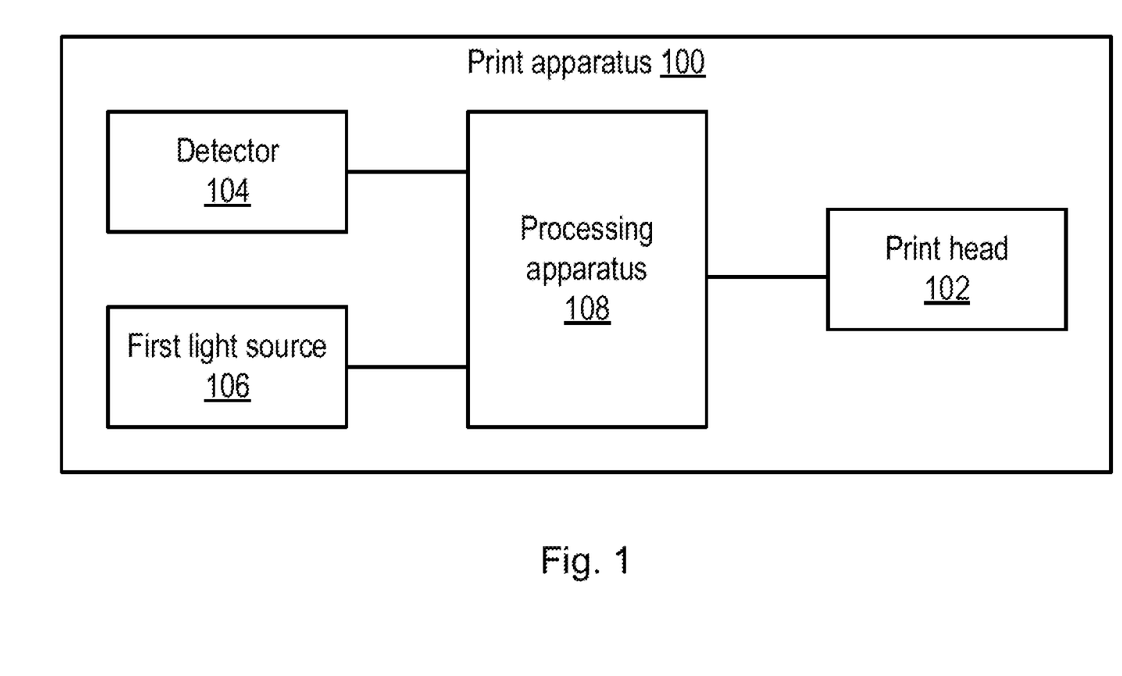
FIG. 1 is a schematic illustration of an example of a print apparatus for determining alignment of fiducials.

FIG. 1 is a schematic illustration of an example of a print apparatus 100 for determining alignment of fiducials. The print apparatus 100 comprises a print head 102, a detector 104, a first light source 106 and processing apparatus 108.

The print head 102 is provided to deposit print agent onto a substrate. The print head 102 may, for example, form part of, or be housed in, a carriage (not shown) which traverses the substrate as print agent is deposited onto the substrate. In some examples, the print head 102 may move across the width of the substrate along a rail. The print agent (e.g. ink) may be deposited or fired onto the substrate from nozzles of the print head. In some examples, a carriage may carry multiple print heads, and each print head may deposit print agent of a different colour. The substrate may, in some examples, be translucent, or semi-transparent. To enable the image printed on the back side of the substrate to be viewed through the substrate (e.g. when back-illuminated), the substrate used for D&N signs may have an opacity of between around 50% and 95% opaque. In some examples, the opacity of a substrate used for D&N signs may be 90% opaque.

The detector 104 is provided to detect a fiducial. For example, the detector 104 may be provided to detect the position of a fiducial on a substrate. The fiducial may, for example, comprise a fiducial printed using the print head 102. In some examples, the detector 104 may be mounted to, or carried by, the carriage. The detector 104 may comprise any type of detector or sensor capable of detecting, such as a charged coupled device (CCD), for example. The detector 104 may be used during a scanning procedure to determine the location of a fiducial printed on the substrate.

The first light source 106 is provided to back-illuminate the substrate, such that light from the first light source may be detected by the detector 104 through the substrate. The first light source 106 may, for example, comprise an LED, such as a white LED. In other examples, a different type and/or colour of light source may be used to back-illuminate the substrate. Owing to the translucency, or semi-transparency of the substrate, some light from the first light source 106 is transmitted through the substrate, such that an image or a pattern (e.g. a fiducial) printed on the back side of the substrate may be discernible to the detector 104.

The processing apparatus 108, which may, for example, comprise a processor or processing circuitry, may be operatively connected to the print head 102, the detector 104 and the first light source 106, such that the processing apparatus may operate or control them individually or concurrently. The processing apparatus 108 is provided to perform various processing activities in respect of the print apparatus 100. The processing apparatus 108 is to operate the print head 102 to deposit print agent to form a first fiducial on a first side of the substrate, the first fiducial comprising a shape of a first colour and having a first dimension, and a background of print agent of a second, different colour. The first dimension of the shape does not exceed a corresponding dimension of the background. In some examples, the first dimension may comprise a height of the shape. Thus, the height of the shape may not exceed the height of the background. In this way, the shape may not extend vertically beyond the background. In other examples, a different dimension may be used, such as a width.

In some examples, the first dimension of the shape may be substantially the same as the corresponding dimension of the background. For example, the background may have a height substantially equal to the first height. In other words, the background may have a height substantially equal to the height of the shape. In this way, the background may not extend vertically beyond the shape. In other examples, the background may surround the shape entirely.

The first side of the substrate may, for example, be referred to as the back side of the substrate. Thus, in some examples, the print apparatus 100 may first print the first fiducial onto the back side of the substrate, and may also print the image on the back side of the substrate before the substrate is flipped for printing on the front side of the substrate. In a further example, the first colour is different to the second colour, so that some degree of contrast exists between the shape and the print agent forming the background, to enable the shape and the background to be distinguished from one another.

The processing apparatus 108 is also to operate the print head 102 to deposit print agent to form a second fiducial on a second, opposite side of the substrate, the second fiducial comprising an inverted version of the shape of the first colour. The second side of substrate may, for example, be referred to as the front side of the substrate. To print the second fiducial on the second side of the substrate, the substrate may be flipped or turned over, either manually or using a component of the print apparatus 100. The inverted version of the shape, that forms the second fiducial, may comprise a mirror-image of the shape, for example a vertically-inverted version of the shape (e.g. inverted about an x-axis of the shape) or a laterally-inverted version of the shape (e.g. inverted about a y-axis of the shape). As noted above, the purpose of printing an inverted version of the shape on the second (e.g. front) side of the substrate is that, when the first and second fiducials are viewed from one side of the substrate, the shape appears to be the same.

The processing apparatus 108 is also to operate the first light source 106 to back-illuminate the substrate. Some light from the first light source 106 may transmit through the substrate, and through the first fiducial, such that the first fiducial may be detected by the detector 104.

The processing apparatus 108 is also to operate the detector 104 to detect the first and second fiducials. In some examples, the second fiducial may be detected without the substrate being back-illuminated by the first light source 106. Thus, the processing apparatus 108 may, in some examples, operate the detector to detect the second fiducial, then operate the first light source to back-illuminate the substrate, then operate the detector to detect the first fiducial.

To detect the first and second fiducials, the processing apparatus 108 may cause the detector 104 to scan over the substrate (e.g. by operating a carriage to traverse the substrate) and, once the first or second fiducial is detected on the substrate, the processing apparatus may determine position of the fiducial. As explained below, the position of the image on the first side of the substrate relative to the first fiducial is predetermined, and the position of the image to be printed on the second side of the substrate relative to the second fiducial is predetermined. Thus, by determining the positions of the fiducials, the positions of the images can also be determined. The first fiducial may be printed at a defined (e.g. predetermined) distance from an edge (or multiple edges) of the first side of the substrate. Since the fiducials on both sides of the substrate are printed in the same logical position, it is possible to determine any difference in the positions of the fiducials on the opposite sides of the substrate, relative to one another.

In some examples, the second (e.g. front) side of the substrate (i.e. the side of the substrate on which the second fiducial is to be printed) may be illuminated to aid detection of the second fiducial by the detector 104. In some examples, the second (e.g. front) side of the substrate may be illuminated using light of a colour that contrasts with the first colour, to improve detection of the second fiducial. While the substrate is illuminated from its second (e.g. front) side, the processing apparatus may cause the first light source to not emit light, such that the substrate is not back-illuminated. Thus, illumination from the front side and the back side of the substrate may alternate temporally.

In some examples, the processing apparatus 108 may separately operate the detector 104 to detect the position of the first fiducial. As noted above, the position of the first fiducial may be determined relative to an edge (or multiple edges) of the substrate. Due to the back-illumination by the first light source 106, the detector 104 is able to discern the first fiducial (i.e. the fiducial printed on the back side of the substrate), and determine its position (e.g. relative to the substrate edge).

The processing apparatus 108 is also to determine whether the first fiducial is aligned with the second fiducial. The first fiducial and the second fiducial are printed in the same positions relative to the images on the respective sides of the substrate. In this way, if the first fiducial is aligned with the second fiducial, it may be determined that the images printed on the opposing sides of the substrate will also be aligned with one another. However, if the first fiducial is not adequately aligned with the second fiducial, then appropriate action may be taken to align the fiducials and, therefore, align the images to be printed on the first and second sides of the substrate.

Figure 2:
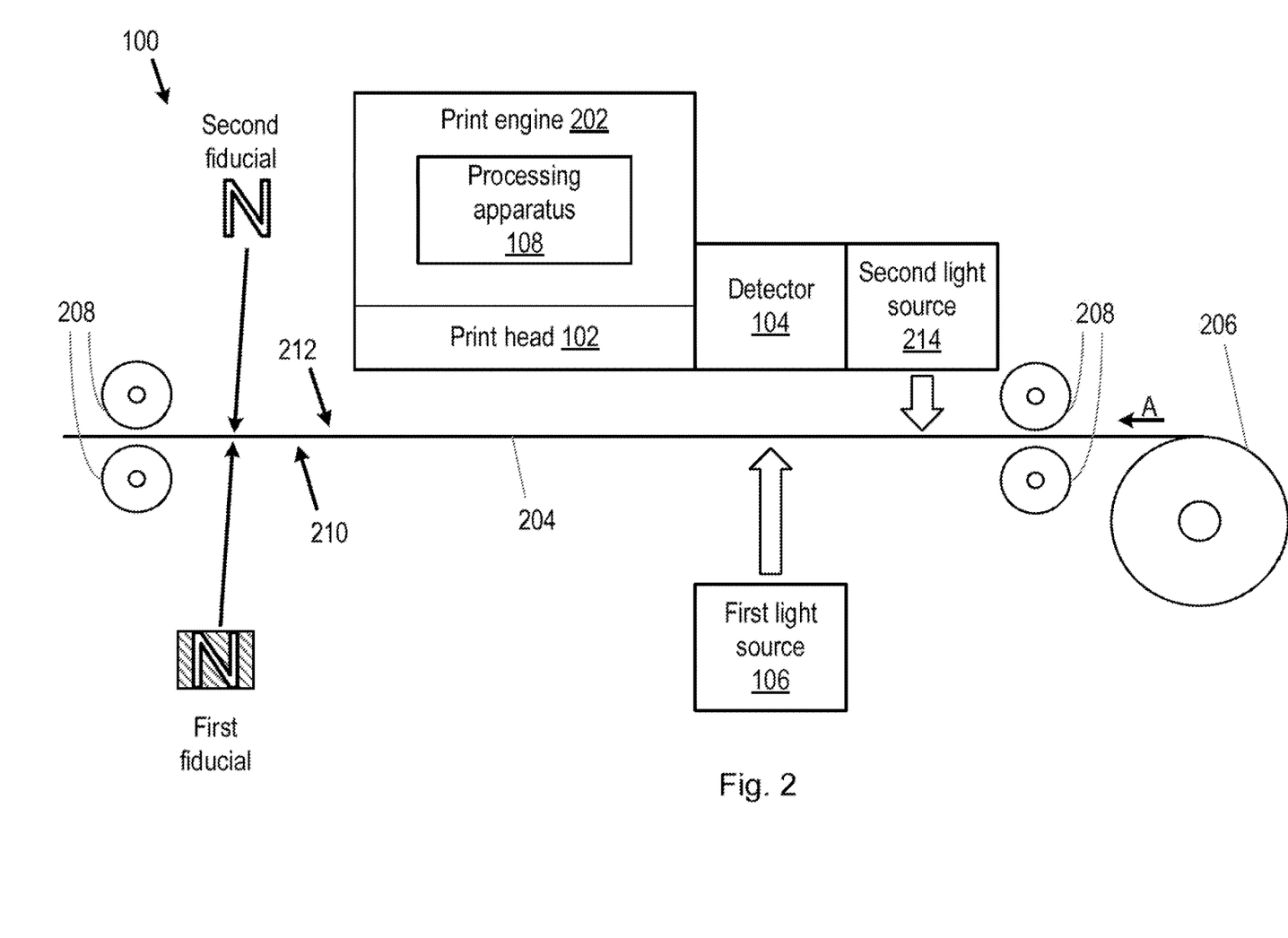
FIG. 2 is a schematic illustration of a further example of a print apparatus for determining alignment of fiducials.

A further example of the print apparatus 100 is shown in FIG. 2. FIG. 2 is a side view of an example of the print apparatus 100. The print apparatus 100 includes the print head 102, the detector 104, the first light source 106 and the processing apparatus 108. The print head 102, the detector 104 and/or the processing apparatus 108 may be housed within, form part of, be connected or mounted to, or be otherwise associated with, a print engine 202. In some examples, the print engine 202 may comprise, or be formed as a carriage, which travels back and forth across the width of the substrate, as discussed above. In the example shown in FIG. 2, a substrate 204 comprises a web of media, which may be fed through the print apparatus 100, towards the printing engine 202, from a substrate source 206 which may, for example, comprise a roll of the substrate. The substrate is fed in a printing direction as shown by the arrow A. The substrate 204 may pass around or between rollers 208, which may serve various functions, such as tensioning and alignment. The substrate 204 has a first side 210 (e.g. the back side) and a second side 212 (e.g. the front side). In some modes of operation of the print apparatus 100, a fiducial and an image may be printed onto the first (e.g. back) side 210 of the substrate 204. Once the image and fiducial has been printed onto the first side 210 of the substrate 204, the substrate may be flipped (e.g. manually by an operator or by a component of the print apparatus 100) and printing of the second side 212 may commence. A fiducial is then printed onto the second (e.g. front) side 212 of the substrate so that an assessment of the alignment of the fiducials can be made.

The print apparatus 100 may, in some examples, further comprise a second light source 214 to illuminate the substrate 204 during operation of the detector 104 to detect the second fiducial. For example, the second light source 214 may illuminate the substrate 204 to assist the detector 104 in determining a position of the second fiducial. The second light source 214 may be located adjacent to the second side 212 of the substrate 204 (i.e. the opposite side of the substrate to the first light source 106). In some examples, the second light source 214 may be located within or form part of the print engine 202. Thus, the second light source 214 may be operated by the processing apparatus 108 to illuminate the substrate 204 to aid detection of the second fiducial on the second side 212 of the substrate. The second light source 214 may, for example, comprise an LED. In other examples, a different type of light source may be used. In some examples, the second light source 214 may comprise a light source to emit light of a colour contrasting with the first colour, to aid detection of the second fiducial by the detector 104. In one example, the second fiducial may be printed in yellow print agent, and the second light source 214 may emit blue light.

Once the processing apparatus 108 has determined whether or not the first fiducial is aligned with the second fiducial, appropriate action may be taken. If it is determined that the first fiducial is aligned with the second fiducial (i.e. the first fiducial and the second fiducial are in corresponding positions on opposite sides of the substrate such that, when the substrate is backlit and viewed from the front, the shapes of the fiducials appear in alignment with one another), then no remedial or corrective action may be taken, and the processing apparatus 108 may control the print head 102 to print an image on the front side (i.e. the second side 212) of the substrate 204. However, if it is determined that the first fiducial is not aligned with the second fiducial (e.g. if there is a misalignment exceeding a defined threshold) then appropriate remedial action may be taken. The appropriate action to be taken may depend on the alignment determination made by the processing apparatus 108. For example, the processing apparatus 108 may determine, based on the alignment determination, an adjustment to be made to a position of an image to be printed onto the first side or the second side of the substrate. For example, if the image has already been printed on the back side 210 of the substrate 204, and it is determined the first and second fiducials are not aligned with one another, then an adjustment may be made to alter the position at which the image is to be printed on the front side 212 of the substrate. The processing apparatus 108 may further implement the determined adjustment of the position of the image to be printed. Such an adjustment may be made by controlling the print head 102 to begin printing the image in a different position along its scanning axis (i.e. across the width of the substrate), and/or by moving the substrate 204 in or against the printing direction A.

Figure 3:
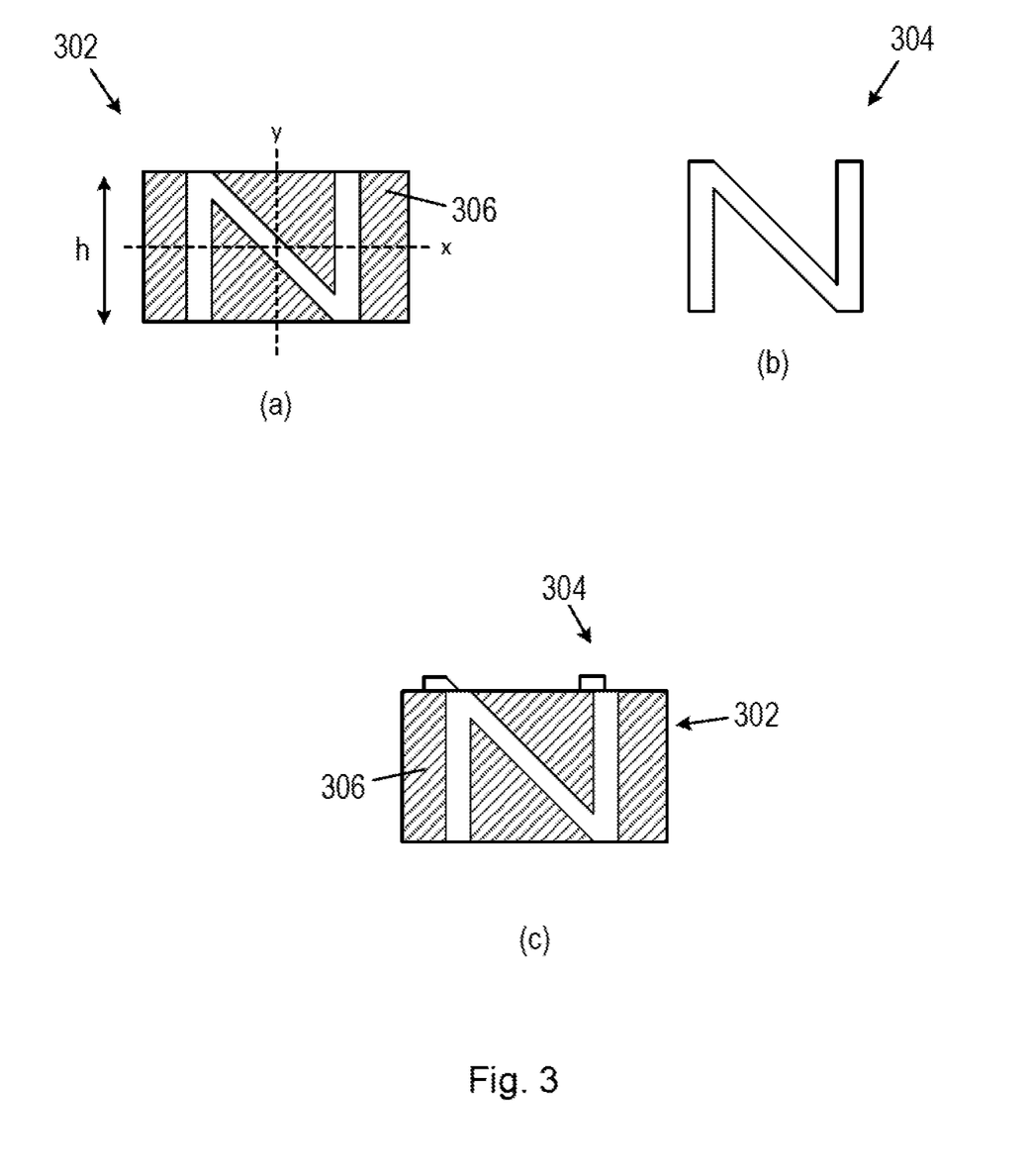
FIG. 3 is an illustration of examples of fiducials.

Reference is now made to FIG. 3, which shows examples of fiducials that may formed using the print apparatus 100, for the purpose of determining alignment. FIG. 3 (a) is an example of a first fiducial 302, to be formed on the first side 210 (i.e. the back side) of the substrate 204, and FIG. 3 (b) is an example of a second fiducial 304, to be formed on the second side 212 (i.e. the front side) of the substrate. The first fiducial 302 comprises a shape which, in this example, is in the form of the letter 'N'. The shape (e.g. the letter 'N') of the first fiducial 302 has a height, h. The second fiducial 304 comprises a mirror image of the 'N' shape which may comprise either a laterally-inverted version of the image (i.e. flipped about a vertical y-axis through the centre of the shape) or a vertically-inverted version of the image (i.e. flipped about a horizontal x-axis through the centre of the shape). The shape (e.g. the inverted or mirrored 'N' shape) of the second fiducial 304 may also have a height, h. The shape (i.e. the 'N' shape and the inverted 'N' shape) may be formed using print agent of any colour. However, in some examples, the shape in both fiducials may be formed using yellow print agent. While, in this example, the shape is in the form of the letter 'N' for the first fiducial and an inverted 'N' for the second fiducial, in other examples, a different shape may be used. In general, the shaped used in the second fiducial is to be an inverted (i.e. mirrored) version of the shape used in the first fiducial.

The first fiducial 302 formed on the first (e.g. back) side 210 of the substrate 204 includes a background 306 of print agent of a second, different colour. The background 306 may have a height substantially equal to the first height, h. Thus, in some examples, the heights of the background 306 and the shape (e.g. the letter 'N') may be the same or substantially the same. In other examples, the height of the background 306 may be greater than the height, h of the shape, such that the background surrounds the shape. In general, the height of the shape (e.g. the 'N' shape) may not exceed the height of the background 306. Thus, the background 306 may be said to at least partially surround the shape. In some examples, the background may extend beyond the shape in the x-direction but not in the y-direction. In other examples, the background may extend beyond the shape in the x-direction and in the y-direction. The print agent of the second colour that forms the background 306 may, in some examples, substantially prevent transmission of light from the first light source 106 therethrough. In one example, the print agent of the second colour may be black. In this way, light from the first light source 106 may be substantially absorbed by the print agent forming the background 306, and prevented from reaching the detector 104. While, in the example shown in FIG. 3, the shape (e.g. the 'N' shape) of the first fiducial 302 and the background 306 may have the same height, h, in other examples, the shape and the background may have the same width, or other dimension. In general, the shape (e.g. the 'N' shape) may have a dimension that does not exceed a corresponding dimension of the background 306. In one example, the height and the width of the background may not exceed the height and the width of the shape.

FIG. 3 (c) is an example of how the first fiducial 302 and the second fiducial 304 might appear when viewed from the front side 212 of the substrate (i.e. the side on which the second fiducial 304 is printed), while being back-illuminated, for example by the first light source 106. In this example, the first fiducial 302 and the second fiducial 304 are not aligned with one another and, as a result, a portion of the second fiducial 304 is visible extending from the edges of the region 306 of the first fiducial 302. However, since the region 306 prevents, or substantially prevents, light from the first light source 106 from being transmitted through the substrate 204, the second fiducial 304 does not interfere with the appearance of the first fiducial 302. When the back-illumination is not present (i.e. when no light is emitted from the first light source 106 through the substrate 204), and the substrate is illuminated by light from the second light source 214, the second fiducial 304 can be detected by the detector 104, and the first fiducial 302 does not interfere with the appearance of the second fiducial. Thus, by forming the fiducials in this way, both fiducials can individually be analyzed, and their locations on the substrate 204 can be determined.

By integrating the alignment determination into the printing workflow, the alignment assessment can be automated, so that the print apparatus 100 can determine whether or not the fiducials are aligned with one another without an operator performing any manual measurements with regard to the fiducials. In this way, the alignment assessment may be carried out quickly, and any adjustments to be made may be effected automatically by the print apparatus 100. Assessing the alignment and making any adjustments using such an automated procedure can be more accurate than forming such tasks manually.

Figure 4:
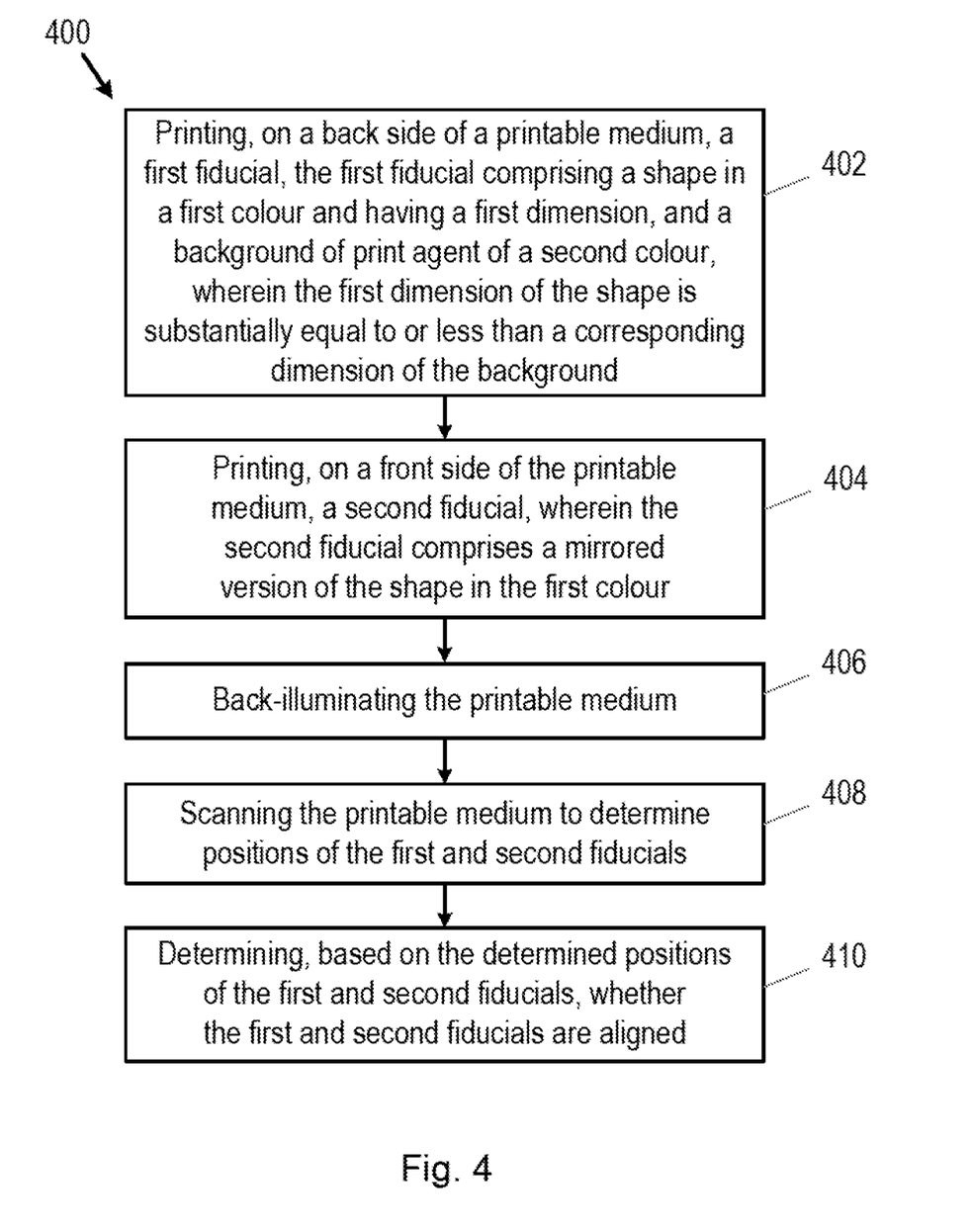
FIG. 4 is a flowchart of an example of a method for determining whether fiducials are aligned.

The present disclosure also relates to a method of determining whether printed fiducials are aligned. FIG. 4 is a flowchart of an example of a method 400 for determining whether printed fiducials are aligned. The method 400 comprises, at block 402, printing, on a back side of a printable medium, a first fiducial, the first fiducial comprising a shape in a first colour and having a first dimension, and a background of print agent of a second colour, wherein the first dimension of the shape is substantially equal to or less than a corresponding dimension of the background. In some examples, the first dimension (e.g. a height or width) of the shape may not exceed the corresponding dimension of the background. The first fiducial 302 may be printed on the back side (e.g. the first side 210) of the printable medium (e.g. the substrate 204). In addition to the first fiducial 302, an image (e.g. an image for an advertisement) may be printed onto the back side of the printable medium. Once the printing of the back side 210 of the printable medium has been completed, the printable medium may be flipped, so that printing of its front side 212 may commence.

The method 400 further comprises, at block 404, printing, on a front side of the printable medium, a second fiducial 304, wherein the second fiducial comprises a mirrored version of the shape in the first colour. For example, the second fiducial may comprise the 'N' shape without the background 306. The first and second fiducials 302, 304 may, in some examples, be printed near to an edge of the substrate. For example, a fiducial or multiple fiducials may be printed along a leading-edge of the substrate and/or a fiducial or multiple fiducials may be printed along one or both sides of the substrate, beside the region where the image is printed or is to be printed. In this way, the fiducials do not overlap or interfere with the image.

The method 400 comprises, at block 406, back-illuminating the printable medium. The back-illumination may be achieved using the first light source 106. The first light source may, in some examples, emit white light, such that some of the emitted light is able to transmit through the printable medium to the detector 104, thereby enabling the detector to discern the first fiducial 302.

At block 408, the method 400 comprises scanning the printable medium to determine positions of the first and second fiducials 302, 304. The scanning of block 408 may, for example, be performed using the detector 104. Scanning may comprise moving the detector 104 (e.g. using the carriage) over the width of the printable medium to detect the first fiducial 302 and the second fiducial 304 and to determine their positions.

At block 410, the method 400 comprises determining, based on the determined positions of the first and second fiducials 302, 304, whether the first and second fiducials are aligned. The first and second fiducials may be considered to be aligned (e.g. with one another) if they are in corresponding relative positions on their respective sides of the substrate 204. Since the position of the fiducial relative to the image on each side of the substrate 204 is predetermined, once the position of the fiducial is determined, the position of the image can also be considered to be determined. Owing to the nature of the fiducials used, and the positions on the printable medium 204 at which the fiducials are printed, it may be possible to determine whether the printable medium has been positioned appropriately for printing, whether the print engine 202 and/or components of the print engine are appropriately calibrated (e.g. whether the print head 102 is calibrated to deliver print agent onto the printable medium in the intended position and at the intended time), and/or whether the printable medium being fed into the print apparatus 100 is skewed.

The determining of block 410 may be performed by a processor, such as the processing apparatus 108. The processing apparatus 108 may, in some examples, be used to effect of instruct other operations discussed above, such as those discussed with reference to blocks 402, 404, 406 and 408.

In some examples, the method may involve scanning the printable medium to determine a position of the second fiducial before the printable medium is back-illuminated (block 406). Then, once the printable medium is back-illuminated, the method may comprise scanning the printable medium to determine a position of the first fiducial. As with the scanning of block 408, the scanning may comprise moving the detector 104 (e.g. using the carriage) over the width of the printable medium to detect the first fiducial 302 and to determine its position.

Figure 5:
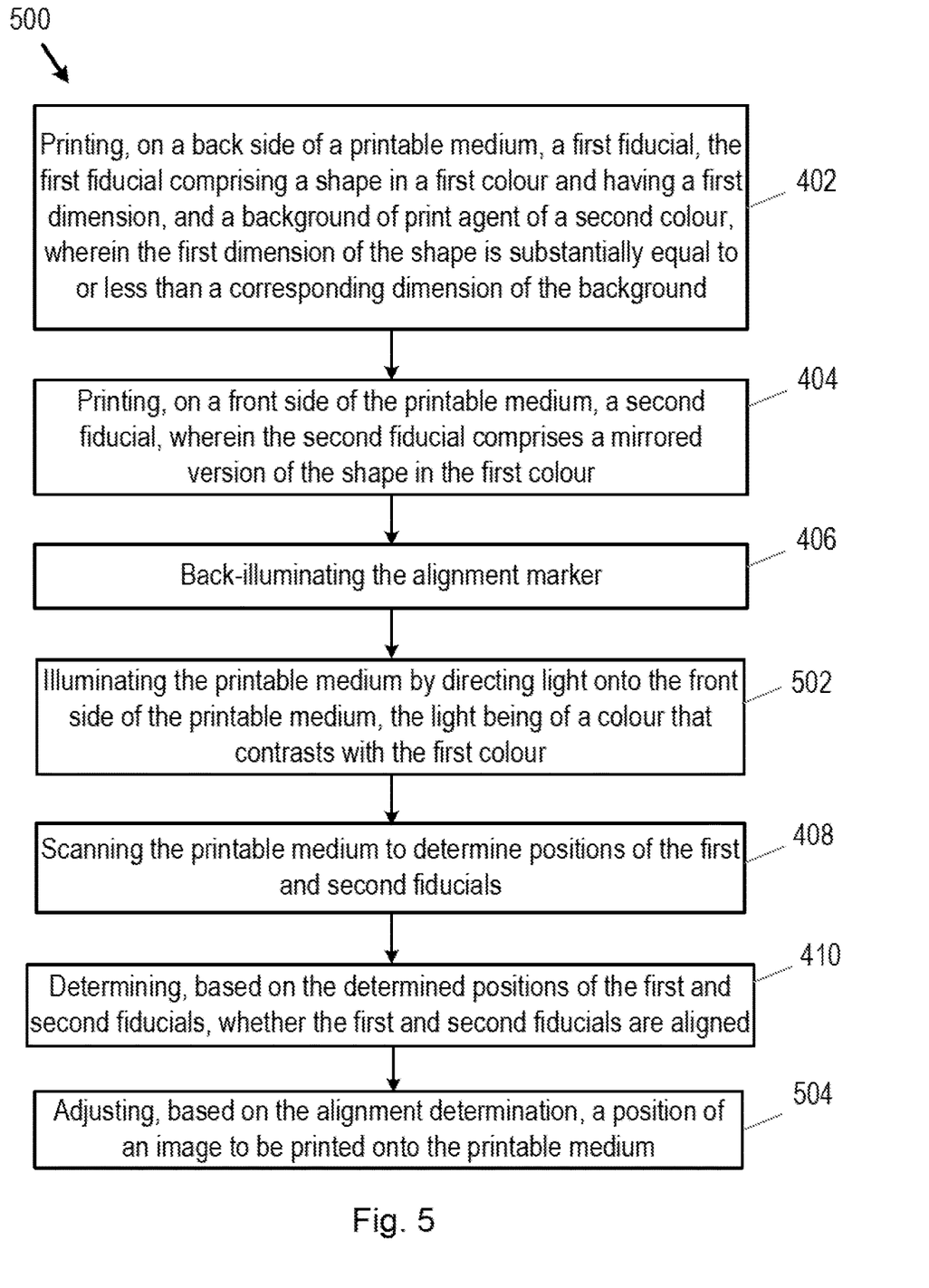
FIG. 5 is a flowchart of a further example of a method for determining whether fiducials are aligned.

FIG. 5 is a flowchart of a further example of a method 500 for determining whether printed images are aligned. The method 500 may comprise blocks of the method 400 discussed above. In some examples, the method 500 may further comprise, at block 502, illuminating the printable medium by directing light onto the front side of the printable medium, the light being of a colour that contrasts with the first colour. The illuminating (block 502) may, for example, be performed prior to the scanning (block 408), such that the light directed onto the front side 212 of the printable medium may be used to illuminate the second fiducial 304 during the scanning. In some examples, the first colour (i.e. the colour used to print the shape) may be yellow, and the light directed onto the printable medium (at block 502) may comprise blue light. The illuminating of block 502 and the back-illuminating of block 406 may take place separately, such that the printable medium is not illuminated (block 502) at the same time as it is back-illuminated (block 406).

In some examples, the second colour (i.e. the colour of the background 306) may be such that light is substantially prevented from being transmitted through the print agent of the second colour. The second colour may, in some examples, be black. In other examples, a different dark colour may be used.

As discussed above, the shape forming the second fiducial 304 and part of the first fiducial 302 may, in some examples, comprise an 'N'-shaped pattern.

A method 500 may, in some examples, further comprise, at block 504, adjusting, based on the alignment determination (block 410), a position of an image to be printed onto the printable medium. The adjusting of block 504 may, in some examples, be performed using the processing apparatus 108. For example, the processing apparatus 108 may cause the position of the printable medium to be adjusted prior to printing the image and/or may control the print head 102 to deliver print agent onto the printable medium in a different location. In other examples, other actions may be taken based on the alignment determination made at block 410.

Figure 6:
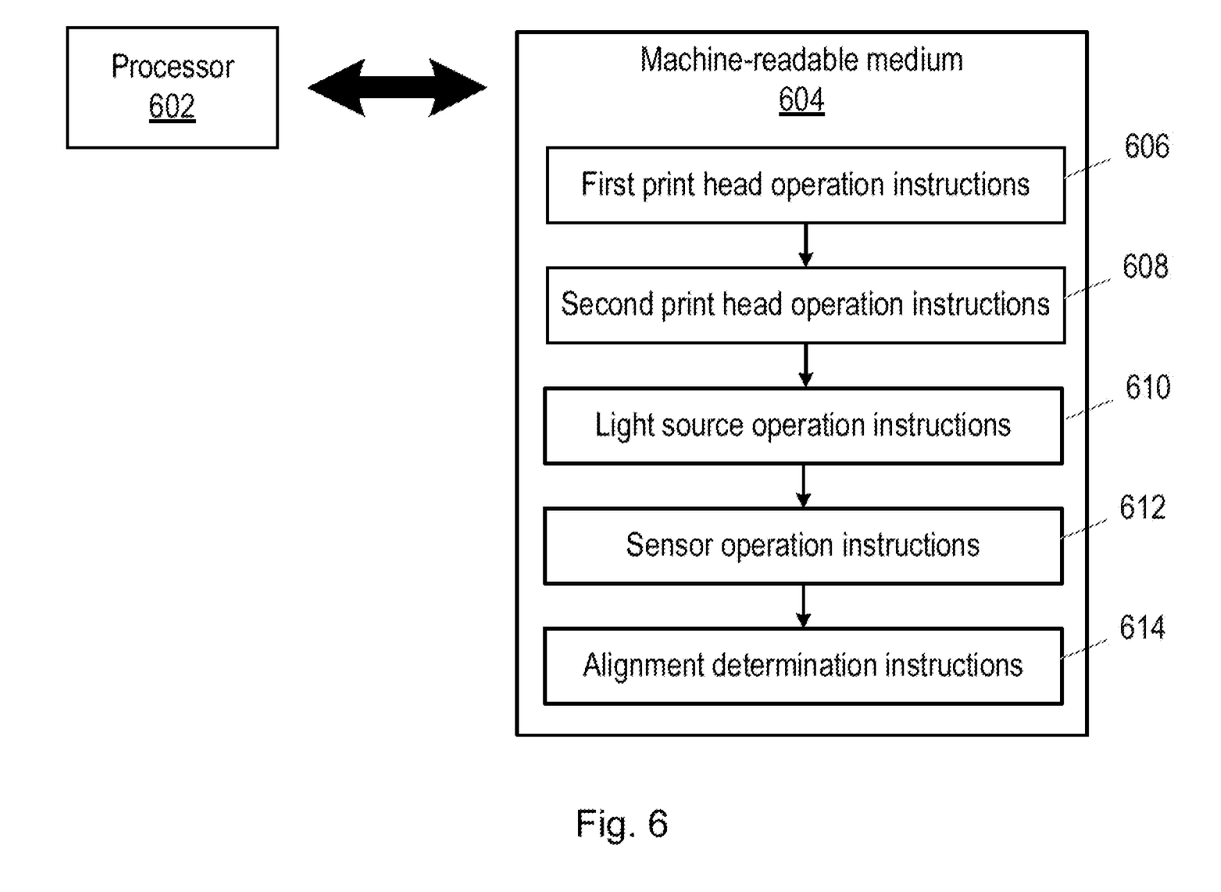
FIG. 6 is a schematic illustration of a processor and a machine-readable medium.

The present disclosure also relates to a machine-readable medium. FIG. 6 is a schematic illustration of a processor 602 and a machine-readable medium 604. The machine-readable medium 604 comprises instructions which, when executed by the processor 602, cause the processor to perform various operations. The operations performed by the processor 602 may comprise processes discussed above with reference to the blocks of the methods 400, 500. In some examples, the operations performed by the processor 602 may cause processes discussed above with reference to the blocks of the methods 400, 500 to be performed.

The machine-readable medium 604 comprises instructions (e.g. first print head operation instructions 606) which, when executed by the processor 602, cause the processor to operate a print head to form, on a first side of a print substrate, a first registration mark in a first colour and having a first dimension, and a background of print agent of a second colour, wherein the first dimention of the first registration mark does not exceed a corresponding dimension of the background. In some examples, the dimension may comprise the height. In some examples, the background may have a dimension (e.g. a height) substantially the same as the height of the registration mark. The machine-readable medium 604 comprises instructions (e.g. second print head operation instructions 608) which, when executed by the processor 602, cause the processor to operate a print head to form a second registration mark on a second side of the print substrate, wherein the second registration mark comprises an inverted representation of the first registration mark, without the background. In some examples, the same print head may be used to form the first and second registration marks.

The machine-readable medium 604 comprises instructions (e.g. light source operation instructions 610) which, when executed by the processor 602, cause the processor to operate a light source to emit light towards the print substrate. The machine-readable medium 604 comprises instructions (e.g. sensor operation instructions 612) which, when executed by the processor 602, cause the processor to operate a sensor, during the emission of the light, to detect a position of the first registration mark and a position of the second registration mark on the print substrate. The machine-readable medium 604 comprises instructions (e.g. alignment determination instructions 614) which, when executed by the processor 602, cause the processor to determine, based on the detected positions of the first and second registration marks, a degree of alignment between the first and second registration marks.

In some examples, the machine-readable medium 604 may comprise instructions which, when executed by the processor 602, cause the processor to operate a sensor to detect a position of the second registration mark on the print substrate before the light source is caused to emit light. Light from the light source may back-illuminate the print substrate. In this way, the second registration mark may be detected first, then the light source may back-illuminate the print substrate, before the sensor is operated to detect the position of the first registration mark.

In some examples, the machine-readable medium 604 may comprise instructions (e.g. parameter modification instructions) which, when executed by the processor 602, may cause the processor to modify, based on the determined degree of alignment, a parameter of a print head and/or an advancement of the print substrate relative to a print head, so as to modify a position at which an image is to be printed onto the print substrate.

The first registration mark may, in some examples, comprise an 'N'-shaped pattern. In some examples, the second registration mark may comprise an inverted 'N'-shaped pattern, and the print agent of the second colour that forms the background may comprise black print agent.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A print apparatus comprising:
a print head to deposit print agent onto a substrate;
a detector to detect a fiducial;
a first light source to back-illuminate the substrate, such that light from the first light source is to be detected by the detector through the substrate; and
processing apparatus to:
operate the print head to deposit print agent to form a first fiducial on a first side of the substrate, the first fiducial comprising a shape of a first colour and having a first dimension, and a background of print agent of a second, different colour, wherein the first dimension of the shape does not exceed a corresponding dimension of the background;
operate the print head to deposit print agent to form a second fiducial on a second, opposite side of the substrate, the second fiducial comprising an inverted version of the shape of the first colour;
operate the first light source to back-illuminate the substrate;
operate the detector to detect the first and second fiducials; and
determine whether the first fiducial is aligned with the second fiducial.

2. A print apparatus according to claim 1, wherein the processing apparatus is to:
determine, based on the alignment determination, an adjustment to be made to a position of an image to be printed onto the first side or the second side of the substrate.

3. A print apparatus according to claim 2, wherein the processing apparatus is to:
implement the determined adjustment of the position of the image to be printed.

4. A print apparatus according to claim 1, further comprising:
a second light source to illuminate the substrate during operation of the detector to detect the second fiducial.

5. A print apparatus according to claim 1, wherein the print agent of the second colour that forms the background substantially prevents transmission of light from the first light source therethrough.

6. A method to determine whether printed fiducials are aligned, the method comprising:
printing, on a back side of a printable medium, a first fiducial, the first fiducial comprising a shape in a first colour and having a first dimension, and a background of print agent of a second colour, wherein the first dimension of the shape is substantially equal to or less than a corresponding dimension of the background;
printing, on a front side of the printable medium, a second fiducial, wherein the second fiducial comprises a mirrored version of the shape in the first colour;
back-illuminating the printable medium;
scanning the printable medium to determine positions of the first and second fiducials; and
determining, based on the determined positions of the first and second fiducials, whether the first and second fiducials are aligned.

7. A method according to claim 6, further comprising:
adjusting, based on the alignment determination, a position of an image to be printed onto the printable medium.

8. A method according to claim 6, wherein the second colour is such that light is substantially prevented from being transmitted through the print agent of the second colour.

9. A method according to claim 6, wherein the second colour is black.

10. A method according to claim 6, wherein the shape comprises an N-shaped pattern.

11. A method according to claim 6, further comprising:
illuminating the printable medium by directing light onto the front side of the printable medium, the light being of a colour that contrasts with the first colour.

12. A method according to claim 11, wherein the first colour is yellow and the light directed onto the printable medium comprises blue light.

13. A machine-readable medium comprising instructions which, when executed by a processor, cause the processor to:
operate a print head to form, on a first side of a print substrate, a first registration mark in a first colour and having a first dimension, and a background of print agent of a second colour, wherein the first dimention of the first registration mark does not exceed a corresponding dimension of the background;
operate a print head to form a second registration mark on a second side of the print substrate, wherein the second registration mark comprises an inverted representation of the first registration mark, without the background;
operate a light source to emit light towards the print substrate;
operate a sensor, during the emission of the light, to detect a position of the first registration mark and a position of the second registration mark on the print substrate; and
determine, based on the detected positions of the first and second registration marks, a degree of alignment between the first and second registration marks.

14. A machine-readable medium according to claim 13, further comprising instructions which, when executed by a processor, cause the processor to:
modify, based on the determined degree of alignment, a parameter of a print head and/or an advancement of the print substrate relative to a print head, so as to modify a position at which an image is to be printed onto the print substrate.

15. A machine-readable medium according to claim 13, wherein the first registration mark comprises an N-shaped pattern, wherein the second registration mark comprises an inverted N-shaped pattern, and the print agent of the second colour that forms the background comprises black print agent.

* * * * *